United States Patent [19]

Christian

[11] 4,111,229
[45] Sep. 5, 1978

[54] CONTROLLING THE FLUID IN A BALL VALVE

[76] Inventor: Timothy T. Christian, 24243 Ocean Ave., Torrance, Calif. 90505

[21] Appl. No.: 783,551

[22] Filed: Apr. 1, 1977

[51] Int. Cl.$^2$ ............................................. F16K 5/10
[52] U.S. Cl. ................................ 137/614.17; 251/315; 251/209; 15/104.06 A
[58] Field of Search .................... 137/614.17; 251/315, 251/209

[56] References Cited

U.S. PATENT DOCUMENTS

| | | | |
|---|---|---|---|
| 2,341,411 | 2/1944 | Ojalvo | 137/614.17 |
| 3,207,181 | 9/1965 | Willis | 137/625.31 |
| 3,707,161 | 12/1972 | Crawford | 137/614.17 X |

Primary Examiner—Arnold Rosenthal
Attorney, Agent, or Firm—W. Edward Johansen

[57] ABSTRACT

The invention is an improvement for controlling the flow of fluid in a conduit to be used in combination with a ball valve. The ball valve includes a valve body which has a bore extending therethrough and which also has an inlet and an outlet which are axially aligned and adapted to be mechanically coupled to the conduit. The valve body also has an aperture therein. The ball valve also includes a spherical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the aperture of the valve body and the stem. The improvement includes a pair of disc carriers which are disposed within the port of the valve member and a pair of discs, with each of the discs being carried by one of the disc carriers with the respective discs being disposed in a contiguous relation. The discs have orifices therethrough which are movable in and out of alignment. The improvement also includes a rotating device for rotating one of the disc carriers relative to the other of the disc carriers which is mechanically coupled to the stem in such a manner that the discs are moved in and out of alignment in order to control the flow of fluid from the inlet to the outlet of the valve body.

3 Claims, 7 Drawing Figures

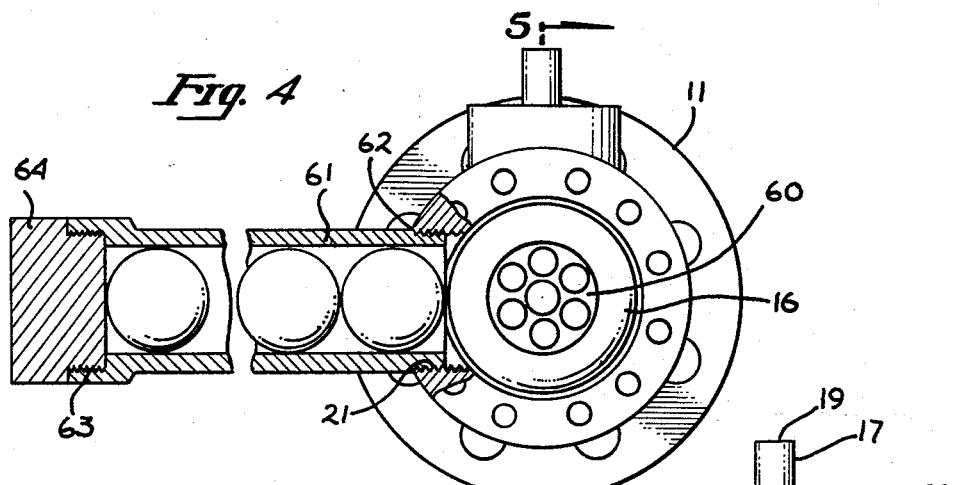
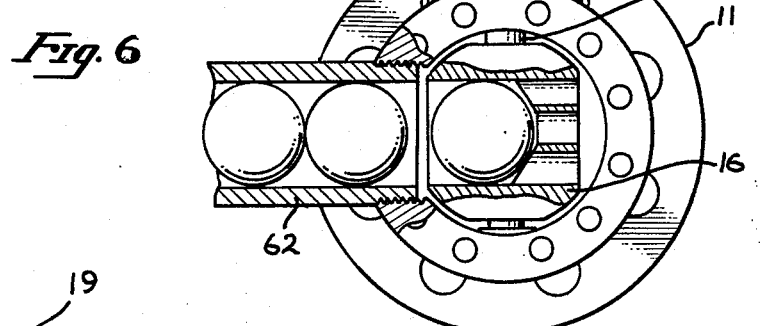
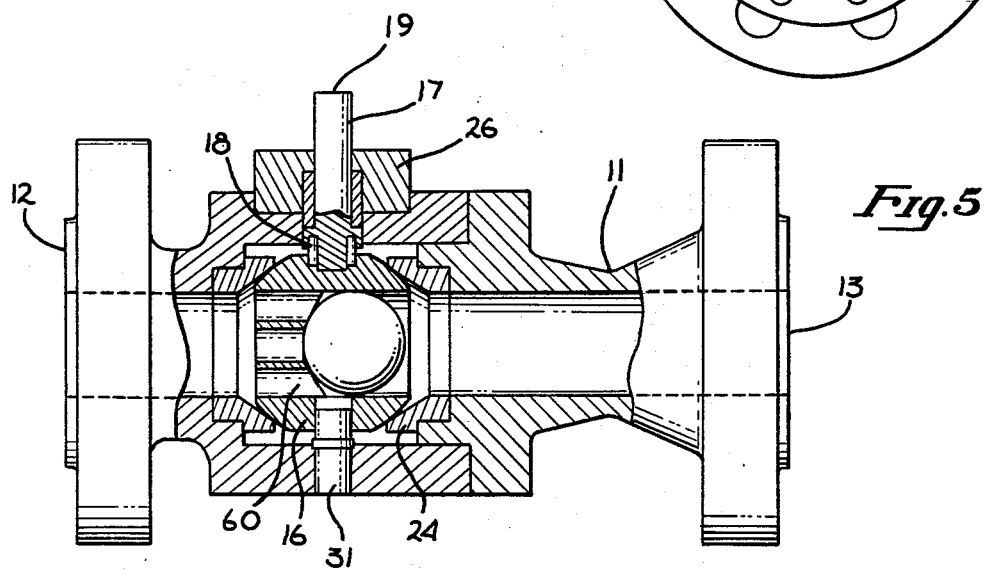
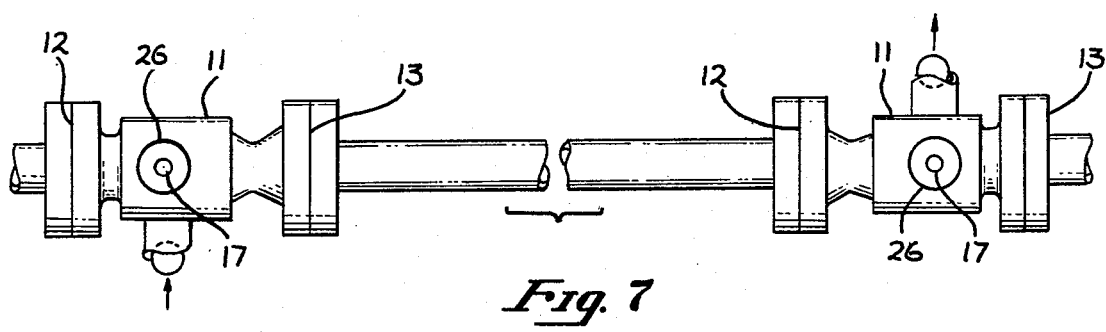

CONTROLLING THE FLUID IN A BALL VALVE

BACKGROUND OF THE INVENTION

1. Field of the Invention

The present invention relates to valves and more particularly to a ball valve that combines the shut-off features of a ball valve and the control features of a multiple orifice valve having therein orifice discs in a mutually contacting relation and having a number of angularly spaced orifices therethrough which upon relative angular movement of the orifice discs may be aligned so enhance or retard the fluid flow through the ball valve.

2. Description of the Prior Art

U.S. Pat. No. 3,207,181, entitled Mutliple Orifice Valve, issued to Robert S. Willis on Sept. 21, 1965, teaches a flow control valve which includes a valve body that has a longitudinally extended opening therein, an inlet leading to the opening and an outlet leading from the opening. The flow control valve also includes a pair of relatively rotatable disc carriers which are disposed within the opening between the inlet and the outlet. Each disc carrier carries a disc so that the respective discs are in a contiguous relation to each other. The flow control valve further includes a device for rotating one of the disc carriers relative to the other disc carrier with the device therefor extending into the valve body. Each disc carrier is a body transversely spanning the opening and has an axially extended outer marginal skirt forming a seat for its disc. The discs and disc carriers have openings therethrough movable into and out of alignment to control the flow of fluid from the inlet to the outlet.

U.S. Pat. No. 3,426,797, entitled Multiple Orifice Valve, issued to William J. Baker on Feb. 11, 1969, teaches a fluid flow control valve having an axially aligned inlet and outlet with relatively rotatable flow controlling discs in face engagement containing respectively a pair of similarly positioned diametrically opposed orifices, a cylindrical disc carrier fixedly mounting one of the discs and having a central passage containing a separate sleeve liner connecting the disc orifice with the outlet, a rotatable cylindrical disc carrier mounting the other disc and having an actuator handle which extends outwardly through an arcuate slot in the valve body, this carrier being sealed on opposite sides of the slot. The valve body is grooved between the seals and is provided with a drain port. The rotatable carrier has a central passage which connects its disc orifices with the inlet and is connected through the port passage with an annular chamber extending about the interface of the discs. The purpose of this fluid flow control valve is to provide a valve which may be installed in a flow line in such a manner that changes in the direction of flow through the valve are not necessary. This valve is adapted to be installed in an in-line conduit as distinguished from the flow control valve of U.S. Pat. No. 3,207,181 which is installed at an angular junction in the conduit. Neither the flow control valve of U.S. Pat. No. 3,207,181 nor the fluid flow control valve of U.S. Pat. No. 3,426,797 provides the positive shut-off capability of a ball valve. Furthermore, the orifices in the discs have a tendency to wear when the flow is reduced below 20% of an open valve.

U.S. Pat. No. 3,226,080, entitled Ball Valve Seat, issued to William E. Lowrey on Dec. 28, 1965, teaches a rotatable plug valve that includes a valve body that has a bore extending therethrough, a spherical valve member that is positioned in the bore and that has a port the axis of which is alignable with the axis of the bore in the open position of the valve and an aperture in the valve body. The rotatable plug valve also includes a stem that has an inner end which is engaged with the valve member and an axially outer end which extends through the aperture in the valve body and a device for forming a seal between the aperture and the stem. The rotatable plug valve further includes detachably connected end members which extend into each end of the bore in the valve body with each end member having a device which limits entry of the end member into the valve body a predetermined amount and with each end member also having a passage with which the port in the valve member can be aligned to form the run of the valve and an axially inner end having a portion taperingly diverging axially outward from the passage. The rotatable plug valve still further includes an annular groove in the taperingly diverging portion of the axial inner end with each annular groove having an inner and outer cylindrical walls which are disposed in coaxial relation with the respective passage and also having an end wall which is disposed in substantially normal relation with the cylindrical walls. There is also an annular seat member of deformable material which is positioned in each of the grooves with each seat member being of lesser radial thickness than the radial thickness of its groove so that in the uncompressed condition there is substantial clearance between the seat member and groove along the entire length of both the inner and outer circumferences of the groove. Each seat member has a portion which extends beyond the surface of the taperingly diverging portion terminating in a tapered surface to oppose the spherical surface of the valve member with each end member extending into the body bore an amount sufficient to force the seat member into intimate sealing contact with the spherical surface of the valve member upon assembly thereby deforming the seat member a limited amount so that the seat members do not completely fill the groove either during assembly or operation within rated pressure whereby the seat members act as a columnar spring against the spherical valve member.

Other ball valves are taught in U.S. Pat. No. 3,269,691, entitled Ball Valve Seal Support, issued to Robert J. Meima and James D. Aitken on Aug. 30, 1966, U.S. Pat. No. 3,269,692, entitled Ball Valve Construction, issued to Homer J. Shafer on Aug. 30, 1966, U.S. Pat. No. 3,269,693, entitled Ball Valve Seat, issued to Ronald A. Gullick on Aug. 30, 1966 and U.S. Pat. No. 3,357,679, entitled Multi-Material Elastomer Seal, issued to Robert A. Gullick on Dec. 12, 1967. The difficulty in using ball valves is that they do not regulate or control the fluid flow through the conduit. There is therefore a need for a ball valve that also has the capability of regulating and controlling fluid flow through the conduit. Such a ball valve should also have an axially aligned inlet and outlet so that it may be installed in an in-line conduit. The ball valve should further be capable of maintaining a preset fluid flow and of reestablishing the preset fluid flow when it has been turned-on after it has been shut-off.

SUMMARY OF THE INVENTION

In view of the foregoing factors and conditions characteristic of the prior art it is a primary object of the present invention to provide a ball valve that has a pair of discs supported in a pair of disc carriers which operates as a multiple disc and orifice valve in order to regulate and control fluid flow.

It is also an object of the present invention to provide a ball valve of the multiple disc and orifice type that may be installed in a flow line in such a manner that changes in the direction of flow through the valve are not necessitated.

It is another object of the present invention to provide a ball valve of the multiple disc and orifice type that may be preset at a particular fluid flow and that can reestablish the particular fluid flow when it is turned-on after it has been shut-off.

It is still another object of the present invention to provide a ball valve of the multiple disc and orifice type that reduces the wear of the orifices of the discs which is caused by the back pressure on the orifices when the fluid flow is reduced below 20% of the fully-open fluid flow.

In accordance with an embodiment of the present invention an improvement for controlling the flow of fluid in a conduit to be used in combination with a ball valve has been described. The ball valve includes a valve body which has a bore extending therethrough and which also has an inlet and an outlet which are axially aligned and adapted to be mechanically coupled to the conduit. The valve body also has an aperture therein. The ball valve also includes a spherical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the apeture of the valve body and the stem. The improvement includes a pair of disc carriers which are disposed within the port of the valve member and a pair of discs, with each of the discs being carried by one of the disc carriers with the respective discs being disposed in a contiguous relation. The discs have orifices therethrough which are movable in and out of alignment. The improvement also includes a rotating device for rotating one of the disc carriers relative to the other of the disc carriers which is mechanically coupled to the stem in such a manner that the discs are moved in and out of alignment in order to control the flow of fluid from the inlet to the outlet of the valve body.

The features of the present invention which are believed to be novel are set forth with particularity in the appended claims.

Other objects and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 4 is a cross-sectional, transverse view of a ball valve that has a pig launcher or trap apparatus mechanically coupled thereto.

FIG. 5 is a cross-sectional, longitudinal view of the ball valve of FIG. 4 taken along line 5—5.

FIG. 6 is a partial, cross-sectional view of the ball valve of FIG. 4 which shows the ball valve member of the ball valve taken along line 6—6 after the ball member has been rotated 90°.

FIG. 7 is a schematic drawing of two paired ball valves of FIG. 4 adapted so that one of the ball valves serves as the pig or ball launcher and the other serves as pig or ball trap.

DESCRIPTION OF THE PREFERRED EMBODIMENT

Figure 1:
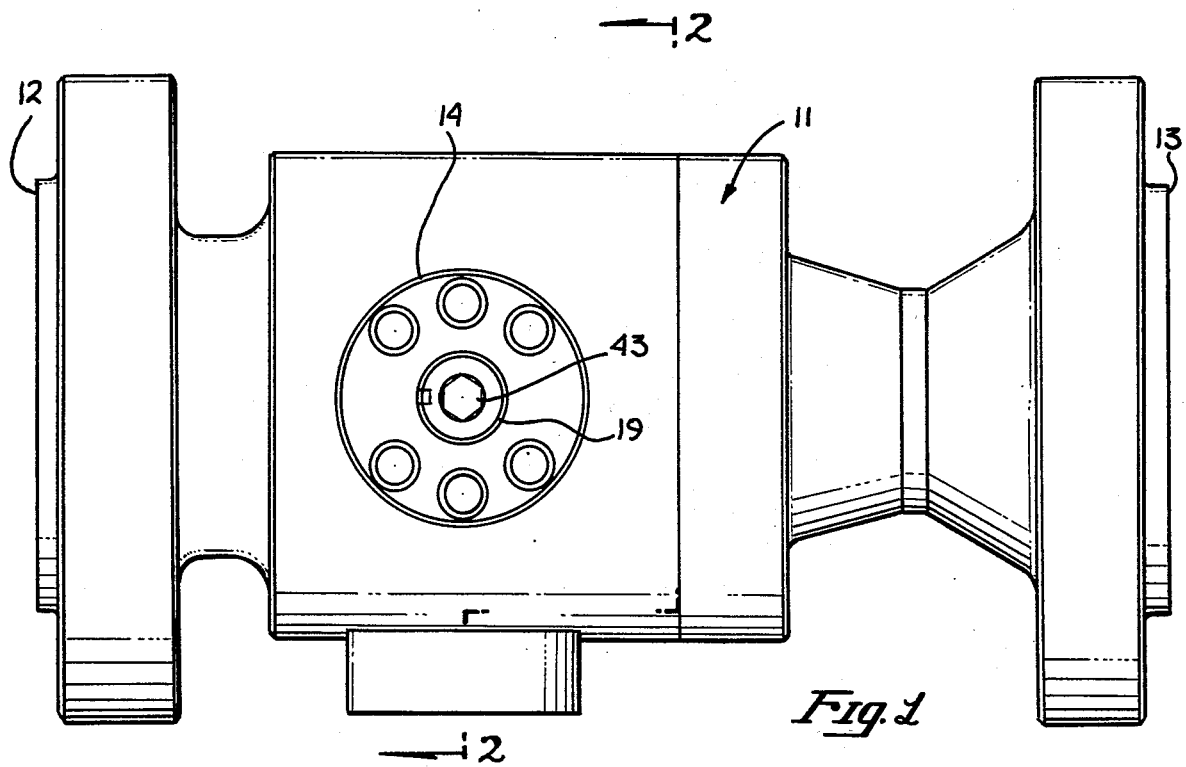
FIG. 1 is a plan view of a ball valve which has an improvement for controlling the fluid flow therein in accordance with the principles of the present invention.

The present invention can best be understood by reference to a detailed description of its preferred embodiment and reference to the accompanying drawing thereof. FIG. 1 is a plan view of a ball valve that is basically similar to the ball valve taught in U.S. Pat. No. 3,226,080 in that the ball valve includes a valve body 11 having an inlet 12 and an outlet 13 which are axially aligned and which are adapted to be mechanically coupled to a conduit. The valve body 11 also has an aperture 14 therethrough.

Figure 2:
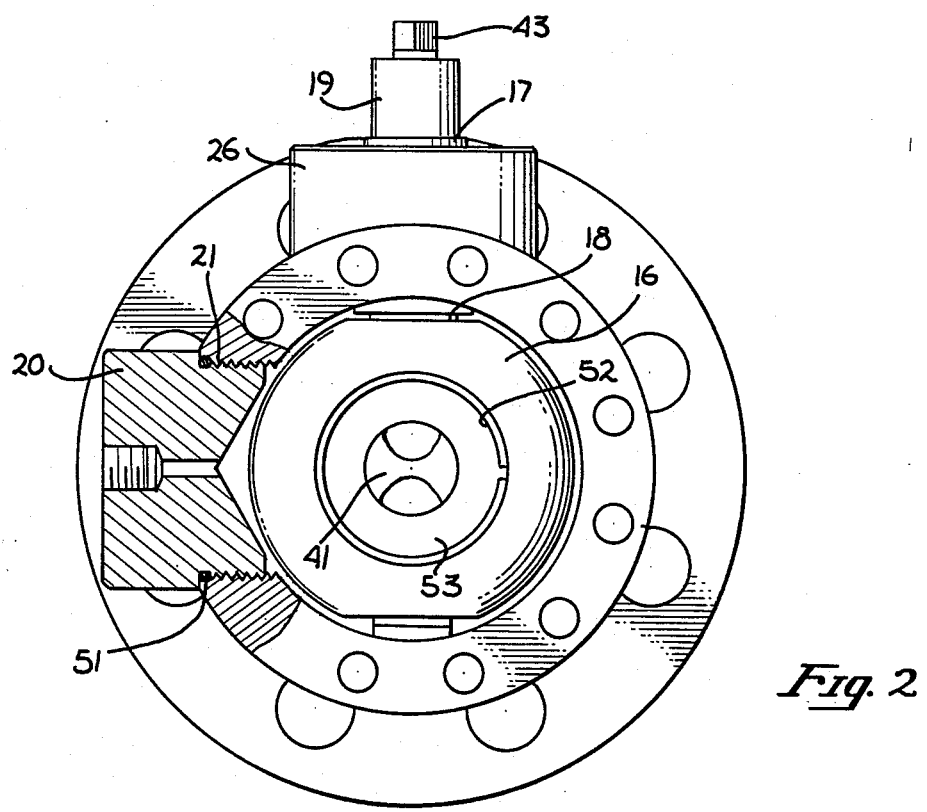
FIG. 2 is a cross-sectional, transverse view of the ball valve of FIG. 1.

Referring now to FIG. 2 a cross-sectional, transverse view shows that the ball valve also includes a bore 15 extending through the valve body 11, a spherical valve member 16 having a port, the axis of which is alignable with the axis of the bore 15 of the valve body 11 and a stem 17 which has an inner end 18 mechanically coupled to the spherical valve member 16 and an axially outer end 19 which extends through the aperture 14 of the valve body 11. The ball valve further includes a threaded plug 20 adapted to be screwed into a threaded socket 21 disposed orthogonally to the stem 17 and to the axis of the bore 15 of the valve body 11 and on the cylindrical surface thereof. The threaded plug 20 provides access to the spherical valve member 16.

Figure 3:
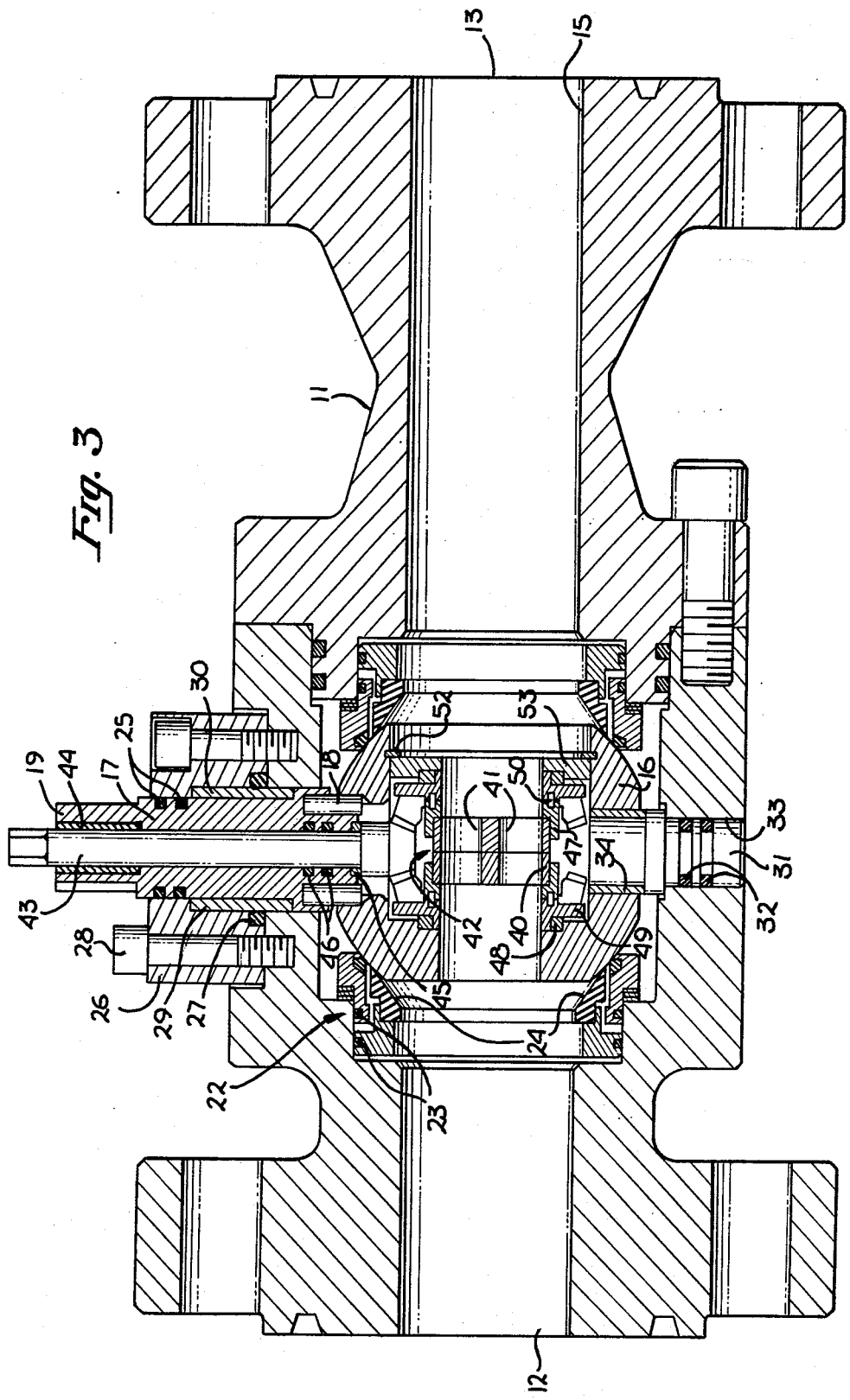
FIG. 3 is a cross-sectional, longitudinal view of the ball valve of FIG. 1 taken along line 3—3 of FIG. 2.

Referring now to FIG. 3 a cross-sectional, longitudinal view shows that the ball valve still further includes a set of seals 22 for forming a gas-tight seal between the aperture 14 of the valve body 11 and the stem 17. Included in this set of seals 22 are two pairs of o-ring and ball seats 23, a pair of ball seats 24, which have large contact surfaces and which are set in deep recesses in order to provide them protection from mechanical damage, distortion or erosion, a pair of o-rings 25 disposed adjacent to the stem 17 and mechanically coupled thereto in order to seal the stem 17 and the aperture 14 of the valve body 11, a bonnet 26 through which the aperture 14 of the valve body 11 extends therethrough and an o-ring 27 for sealing the mechanically coupled bonnet 26 and aperture 14 of the valve body 11. Although a handle or wrench is not shown, there is a capscrew 28 disposed on the bonnet 26 which serves as a ball stop.

The mechanically-coupling apparatus 29 of the ball valve includes a set of bearings 30 for the stem 17 disposed adjacent thereto and mechanically coupled to the bore within the bonnet 26 so that the stem 17 may rotate therein, a ball support stem 31 on which spherical valve member 16 rests, a pair of o-rings 32 which provides a gas-tight seal between it and an aperture 33 of the valve body 11 below the spherical valve member 16 and a bearing 34 mechanically coupled to the ball support stem 31.

The ball valve still further yet includes an improvement for controlling the flow of fluid within a conduit. The improvement includes a pair of orifice disc carriers 40 which are disposed within the port of the spherical valve member 16, a pair of orifice discs 41, each of which is carried by one of the disc carriers 40 with the respective discs being disposed in a contiguous relation and an apparatus 42 for rotating one of the disc carriers 40 relative to the other disc carrier 40. The discs 41 and the disc carriers 40 both have orifices therethrough and are movable in and out of alignment. The apparatus 42 for rotating the discs 41 and the disc carriers 40 includes an internal stem 43 disposed within the stem 17 and mechanically coupled so that it can rotate therein by a bearing 44 which is disposed between the internal stem 43 and the stem 17 and a thrust bearing 45 similarly disposed. A pair of o-rings 46 forms a seal between the internal stem 43 and the stem 17. The apparatus 42 for rotating the discs 41 and the disc carriers 40 also includes a pair of ring gears 47 which are disposed within the port of the spherical valve member 16 and which are mechanically coupled to the internal stem 43 by a pair of bearing and ring gear plates 48 which are in the port of the spherical valve member 16, a pair of ring gear plates 49 which are disposed adjacent to the bearing and ring gear plates 48 and a set of four spring pins 50 which mechanically couple the ring gears 47 to the disc carriers 40. This interconnection between the internal stem 43 and the disc carriers 40 is taught in U.S. Pat. No. 1,592,471, entitled Valve, issued to Michael Smolensky on July 13, 1926. In U.S. Pat. No. 1,592,471 the mechanically coupled stem and gearing operated together in order to rotate a movable disc in and out of alignment with a stationary disc.

In the invention the threaded plug 20 is used as an inspection bonnet and is sealed by an o-ring 51. When the threaded plug 20 is removed and the ball valve is shut-off by the rotation of the spherical valve member 16 90°, the disc carriers 40 and the discs 41 may be removed by removing a retainer snap ring 52 and a backing plate 53 and then pulling the disc carriers 40 and the discs 41 through the threaded socket 21 of the valve body 11.

The operation of the improvement for controlling the flow of fluid in a conduit is similar to the operation of the device taught in U.S. Pat. No. 3,207,181, entitled Multiple Orifice Valve, issued to Robert S. Willis on Sept. 21, 1965. The advantage of the present invention is that it may be shut-off without changing the multiple orifice valve setting thereby insuring that the orifices in the discs 41 will not be subjected to erosion caused by the fluid flow when it is reduced below 20%.

Referring now to FIG. 4 a ball valve includes a second improvement that is distinct from the first improvement described above. The second improvement includes all the basic elements of the ball valve described above, but the spherical member 16 is machined internally different in order to provide a screen 60. The second improvement also includes a tubular member 61 which has a threaded end 62 which is adapted to replace the threaded plug 20 and another end 63 having a closure cap 64. The tubular member 61 is adapted to contain a number of pigs or balls which are used to clean the pipe in the conduit.

Referring now to FIG. 5 in conjunction with FIG. 4 it can be seen that a ball valve with this second improvement performs as any other ball valve and that only when it is necessary to clean the conduit-pipe does this ball valve perform differently.

Referring now to FIG. 6 a partial cross-sectional view shows the spherical valve member 16 rotated 90° within the bore of the valve body 11. Referring now to FIG. 7 there are a pair of ball valves which include the second improvement and which are adapted so that one ball valve serves as the pig launcher and the other serves as the pig trap.

From the foregoing it can be seen that an improvement to a ball valve for controlling the flow of fluid through a conduit has been described. The improvement incorporates the principle of the multiple orifice valve into a ball valve and attains the advantages generally associated with both of these valve configurations.

It should be noted that the schematics of the improvement to the ball valve are not drawn to scale and that the distances of and between figures are not to be considered significant.

Accordingly, it is intended that the foregoing disclosure and showings made in the drawing shall be considered only as an illustration of the principle of the invention.

What is claimed is:

1. An improvement for controlling the flow of fluid in a conduit to be used in combination with a ball valve which includes:
   a. a valve body having a bore extending therethrough, said valve body having an inlet and an outlet which are axially aligned and adapted to be mechanically coupled to the conduit and said valve body also having an aperture therein;
   b. a spherical valve member having a port, the axis of which is alignable with the axis of the bore of said valve body;
   c. a stem having an inner end mechanically coupled to said spherical valve member and an axially outer end which extends through the aperture of said valve body; and
   d. sealing means for forming a seal between the aperture of said valve body and said stem, said improvement comprising:
   a. a pair of disc carriers disposed within the port of said valve member;
   b. a pair of discs, each of said discs being carried by one of said disc carriers with the respective discs being disposed in a contiguous relation, said discs having orifices therethrough which are movable in and out of alignment; and
   c. rotating means for rotating one of said disc carriers relative to the other of said disc carriers, said rotating means mechanically coupled to said stem in such a manner that said discs are moved in and out of alignment in order to control the flow of fluid from the inlet to the outlet of said valve body.

2. An improvement for controlling the flow of fluid in a conduit according to claim 1, wherein said rotating means comprises:
   a. an internal stem disposed within said stem and mechanically coupled thereto so that said internal stem can rotate therein;
   b. gearing means for mechanically coupling said internal stem to one of said disc carriers so that said internal stem can rotate said disc carrier; and
   c. stem sealing means for forming a seal between said stem and said internal stem.

3. An improvement for controlling the flow of fluid in a conduit according to claim 1, wherein said rotating means comprises:
   a. a pair of ring gears, each of which is mechanically coupled to one of said disc carriers in such a manner that any rotation of said ring gears causes said disc carriers to move relative to each other;
   b. bearing means for providing a set of bearing between said stem and said internal stem; and
   c. coupling means for coupling said internal stem to said pair of ring gears so that any rotation of said internal stem is translated to said disc carriers.

* * * * *